July 22, 1952     T. W. WINSTEAD     2,604,297
VALVE FOR INFLATABLE ARTICLES
Filed Nov. 20, 1946
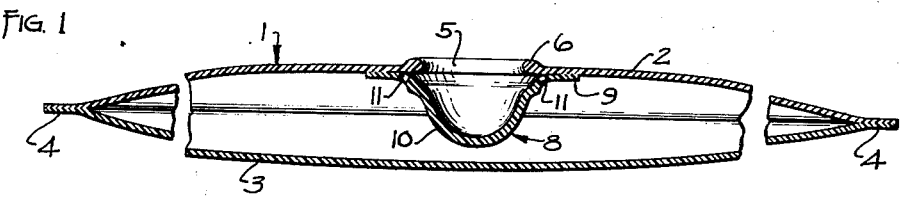
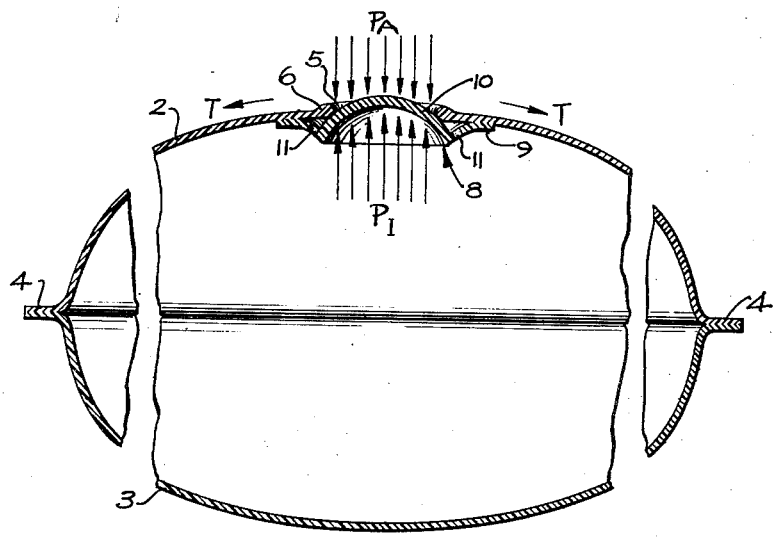
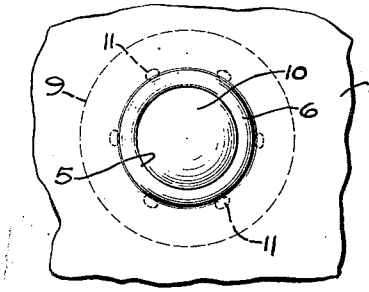
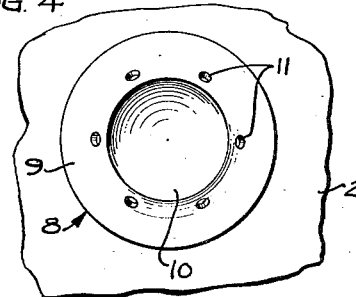
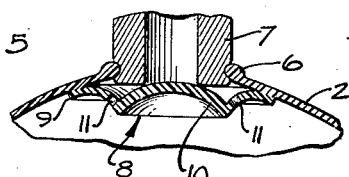
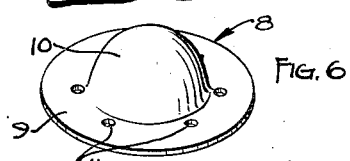
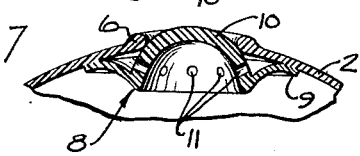
INVENTOR
THOMAS W. WINSTEAD Patented July 22, 1952

2,604,297

UNITED STATES PATENT OFFICE 2,604,297

VALVE FOR INFLATABLE ARTICLES

Thomas W. Winstead, Baltimore, Md.

Application November 20, 1946, Serial No. 711,001

5 Claims. (Cl. 251—122)

The present invention relates to valves and more particularly to an air valve for inflated articles, such as air-mattresses, cushions, floats and the like.

Articles of the above character usually consist of a hollow flexible bag adapted to be inflated for temporary use and, when not in use, deflated so that it may be rolled or folded up into a compact bundle for carrying or storage. The bag is inflated through a filling opening which is equipped with closing means usually consisting of a valve arrangement by means of which the inflated pressure may be maintained or released at will. Check valve arrangements, normally maintained close by differential in inflated and atmospheric pressures or by other mechanical means, have been proposed, but the valves heretofore proposed have had several disadvantages, the principal of which is the necessity of supplemental means of holding the valve open while the article is being deflated. An air-mattress or float, for example, holds a substantial volume of air and takes considerable time to deflate through the relatively small filling opening, and during this time the valves heretofore proposed have had to be held open by the finger or by insertion therein of a match stick or a similar implement.

It is therefore one of the objects of this invention to provide a valve for inflatable articles which serves as a check valve during inflation, maintains the filling opening sealed while the article is inflated, but which may be manipulated to an open position and maintained in its open position without the use of supplemental means for deflating the article.

Another object of the invention is to provide a valve of the above character which is contained inside of the article and provides a substantially flush closure for the filling opening of the article.

A further object of the invention is to provide a valve of the above character which utilizes both the differential in inflated and atmospheric pressures and the tension force in the material of the inflated article for effecting a tight seal of the filling opening.

A still further object of the invention is to provide a flexible valve of the above character which is of one-piece molded design, is simple and economical to manufacture, is easy to affix to the article, and is positive and efficient in operation.

To accomplish the above and other important objects and advantages, the invention comprises generally a one-piece resilient valve element which may be molded from thermoplastic material and which consists essentially of a flat circular disc having a central hollow hemispherical dome capable of being reversed and maintaining its reversed position, and a series of ports adjacent the base of the dome. The disc is bonded at its periphery to the inner surface of a wall of an inflatable article centrally with respect to a filling aperture in the wall so that the dome, in one position thereof, seats within the aperture and closes the same and in a reversed position opens the aperture.

In the accompanying drawings there are shown preferred embodiments of the invention. It is to be understood, however, that the forms shown are by way of example only, and the invention is not to be construed as limited to the specific forms shown.

In the drawings:

Figure 1 is a fragmental transverse sectional view of an inflatable flexible article such as a float, air-mattress or the like showing one form of valve according to this invention in position for deflating the article.

Figure 2 is a view similar to Figure 1 but showing the article inflated and the valve in position for maintaining the inflated condition.

Figure 3 is a fragmental exterior plan view showing the inflating aperture and valve.

Figure 4 is an interior plan view of the inflating valve and associated part of the article wall.

Figure 5 is a fragmental sectional view taken through the sealing opening and valve and showing the nozzle of a filling pump in the opening.

Figure 6 is a view in perspective of the embodiment of valve element shown in Figure 1.

Figure 7 is a fragmental transverse sectional view through a modified valve element and associated part of the inflatable article.

Referring more particularly to the drawings, there is shown in Figure 1 a hollow, flexible, inflatable article, such as an air-mattress, float or the like, which may be made of thermoplastic sheet material, and which comprises upper and lower walls 2 and 3 bonded together at their marginal edges, as indicated at 4. The wall 2 is provided with a filling aperture 5 adapted to receive a nozzle of an inflating pump 7, such as shown in Figure 5. The aperture 5 may be a simple punched hole but preferably is formed with a peripheral bead 6.

Adapted to control the flow of air through the aperture 5 is a valve element, indicated generally as 8, and which comprises a circular disc 9 in the center of which is formed a hollow, generally hemispherical dome 10 having an equatorial diameter somewhat larger than the diameter of aperture 5. Adjacent the base of the dome 10, the valve element is provided with a circular series of small ports 11.

The valve element 8 is of one piece molded construction, made of flexible and preferably somewhat elastic thermoplastic material, and may easily be formed by simple and inexpensive injection molding. The disc portion 9 is formed relatively thin while the dome portion 10 is preferably of thicker wall section particularly in the base or equatorial region thereof, so that when the dome is reversed or turned inside out, as will be further described, the circumferential tension about the base of the dome, together with its substantially thick wall section, will cause it to maintain its reversed condition even under the inflation air pressure in the article. The ports 11 may be either punched, or formed in the molding process, and may be located either in the disc 9 adjacent the base of the dome, as shown in Figure 6, or in the dome itself adjacent its base, as shown in Figure 7.

The peripheral edges of the disc portion 9 of the valve element is bonded, such as by heat-seaming, to the inner surface of the wall 1 concentrically with respect to the aperture 5 so that the dome 10 is axially aligned with the aperture, and in the normal or molded condition of the valve element, projects into the aperture 5 to close the same, as seen in Figure 2.

When the article is to be inflated, the valve element 8 is in its normal or molded position and the nozzle of the inflating pump 7 is inserted in the aperture 5. Air on the down or discharge stroke of the pump forces the dome slightly inwardly and enters the interior of the article through the ports 11. The force of the air is insufficient, however, to reverse the dome and, on the up or suction stroke of the pump, the crown of the dome will be urged into sealing engagement with the mouth of the pump nozzle and function as a check valve for the discharge side of the pump.

When the article has been inflated to desired pressure, the pump nozzle is withdrawn and the valve dome will be urged upwardly into the aperture 5 into tight sealing engagement with the rim of the aperture by combination forces created by differential in interior pressures $P_I$ and atmospheric pressures $P_A$ which force the dome outwardly toward the aperture, and tension forces T in the wall of the inflated article which tend to flatten the wall and thereby force the rim of the aperture inwardly toward the dome, as indicated diagrammatically in Figure 2. It might be mentioned that this latter force can be increased or decreased depending upon the height of the dome 10. It may be seen also in Figure 2 that, by virtue of the dome-aperture diameter ratio and the substantial wall thickness of the dome 10, the top of the dome lies substantially flush with the outer surface of the article and provides a substantially flush closure for the aperture.

When it is desired to deflate the article, the dome 10 is simply reversed or turned inside out to the position shown in Figure 1 by pushing inwardly on the dome with the finger. The dome, by its construction, as set forth above, will hold this position and air will flow freely out of the article through the ports 11 and the aperture 5. After the article is deflated, or before it is to be reinflated, the dome 10 is again reversed to its normal or inverted position. This is done by pressing upwardly on the lower wall 2 of the article below the dome.

Although in the structure illustrated the valve 8 is formed as a separate piece and bonded to the wall of the article beneath an aperture formed in its wall, it will be understood that an assembly consisting of the disc 9, dome 10 and a second disc having the aperture 5 therein could be formed as an integral unit and secured into an appropriate opening in the article wall without departing from the spirit of the invention. It is to be understood also, that the valve element 8 could be formed in various other sizes and shapes, than those shown, so long as the dome or equivalent projection is capable of reversal and maintaining its reversed condition.

From the foregoing it will be seen that the invention provides a cheaply and simply made, and positively operating valve for inflatable flexible articles. It will serve efficiently as a check valve while inflating, will provide an effective seal to maintain the inflated condition of the article, and which may be easily manipulated to rapidly deflate the article without the necessity of holding the valve opening by supplementary means.

I claim:

1. A valve for inflatable articles of the character described comprising a flexible wall having an aperture therethrough, a flexible valve element including a disc bonded about the periphery thereof to the inner surface of the wall surrounding said aperture, said disc having a reversible hollow domed portion axially aligned with said aperture, said domed portion being movable in a normal position thereof in a direction toward the aperture to close the same and movable in a reversed direction to reverse the dome and open the aperture, the portion of the disk located between the bonded periphery thereof and the dome being so constructed and arranged as to be disposed away from the flexible wall when the domed portion occupies its normal position said domed portion in normal position making a substantially line contact with the wall about said aperture, and port means in said element removed from the region of the aperture to permit passage of air through said element.

2. A valve for inflatable articles of the character described comprising a flexible wall having a circular aperture therein, a flexible valve element including a circular disc bonded about the periphery thereof to a region of the inner surface of said wall concentric with said aperture and radially removed therefrom, said disc having a central, reversible hollow dome, said dome being movable in a normal position thereof in a direction toward the aperture to close the same and movable in a reversed direction to reverse the dome and open the aperture, the portion of the disk located between the bonded periphery thereof and the dome being so constructed and arranged as to be disposed away from the flexible wall when the domed portion occupies its normal position said dome in normal position making a substantially line contact with the wall about said aperture, and port means in said element removed from the region of the aperture to permit passage of air through the element.

3. A valve for inflatable articles of the character described comprising a flexible wall having a circular aperture therein, a flexible valve element including a circular disc bonded about the periphery thereof to a region of the inner surface of said wall concentric with said aperture and radially removed therefrom, said disc having a central, reversible hollow dome said dome being movable in a normal position thereof in a direction toward the aperture to close the same and movable in a reversed direction to reverse the dome and open the aperture, the portion of the disk located between the bonded periphery thereof and the dome being so constructed and arranged as to be disposed away from the flexible wall when the domed portion occupies its normal position said dome in normal position making a substantially line contact with said wall about the aperture, port means in the disc radially removed from the aperture to permit passage of air through the element.

4. In a flexible, inflatable article of the character described, in combination with a wall thereof having a filling aperture therein, a flexible valve element comprising a circular disc bonded about the periphery thereof to a region of the inner surface of said wall concentric with said aperture and radially removed therefrom, said disc having a central hollow reversible dome, said dome normally bulging toward the aperture and engaging said surface in substantially line contact therewith about the aperture to close the same, the portion of the disk located between the bonded periphery thereof and the dome being so constructed and arranged as to be disposed away from the flexible wall when the domed portion occupies its normal position said dome being reversible to extend inside the article and open the aperture by pressure applied externally of the article, and port means in the element removed from the region of the aperture to permit passage of air through the element.

5. In a flexible, inflatable article of the character described, in combination with a wall thereof having a filling aperture therein, a flexible valve element comprising a circular disc bonded about the periphery thereof to a region of the inner surface of said wall concentric with said aperture and radially removed therefrom, said disc having a central hollow reversible dome, said dome normally bulging toward the aperture and engaging said surface in substantially line contact therewith about the aperture to close the same, the portion of the disk located between the bonded periphery thereof and the dome being so constructed and arranged as to be disposed away from the flexible wall when the domed portion occupies its normal position said dome being reversible by pressure applied externally of the article to extend inside the same and open the aperture port means in the disc radially removed from the aperture to permit passage of air through the element.

THOMAS W. WINSTEAD.

REFERENCES CITED

The following references are of record in the file of this patent:

UNITED STATES PATENTS

| Number | Name | Date |
|---|---|---|
| 1,942,959 | Fenton | Jan. 9, 1934 |
| 2,044,913 | Miller | June 23, 1936 |
| 2,102,824 | White | Dec. 21, 1937 |

FOREIGN PATENTS

| Number | Country | Date |
|---|---|---|
| 766,854 | France | of 1934 |